Aug. 6, 1968    J. D. CROSS ETAL    3,395,726
MASS FLOW MEASURING APPARATUS
Filed June 14, 1966    3 Sheets-Sheet 1

Inventors
John Denis Cross
Lawrence Goodwin
By
Karl W. Flocks, Attorney

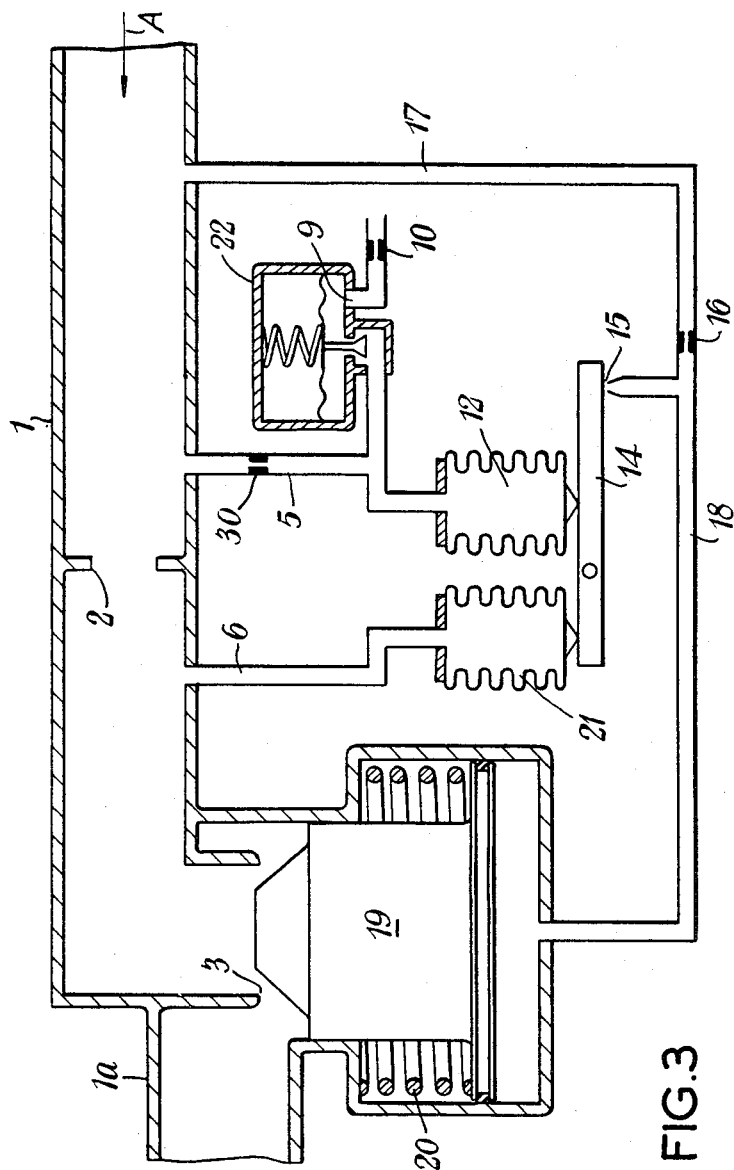

United States Patent Office 3,395,726
Patented Aug. 6, 1968

3,395,726
MASS FLOW MEASURING APPARATUS
John D. Cross, St. Albans, and Laurence Goodwin, London, England, assignors to The De Havilland Aircraft Company Limited, Hatfield, England, a company of Great Britain
Filed June 14, 1966, Ser. No. 557,413
Claims priority, application Great Britain, May 10, 1963, 14,663/63
19 Claims. (Cl. 137—468)

ABSTRACT OF THE DISCLOSURE

The invention is concerned with apparatus for measuring and controlling the flow of a fluid, in which a subsidiary flow line is provided to carry a proportion of the main flow and to generate a reference pressure which is both a measure of the flow and is used directly to control the flow. Preferably temperature compensating means are included so that the apparatus maintains a constant mass flow.

---

This invention relates to apparatus for measuring and controlling the mass flow of a fluid, and this application is a continuation-in-part of our U.S. patent application No. 365,966 filed on May 8, 1964, now abandoned.

In its simplest form, apparatus according to the invention is intended to respond to the mass flow of a fluid which is either substantially incompressible (so that its density is substantially independent of temperature), or which is maintained at a substantially constant temperature, or which is maintained within a predetermined range of temperatures (within which range its density is substantially independent of temperature). However, the invention also extends to relatively more complicated apparatus which is intended to respond to the mass flow of a fluid of which the temperature may vary and of which the density varies with such temperature changes.

According to a first aspect of the invention, there is provided apparatus for controlling the mass flow of a fluid through a main flow line, the apparatus including a main fixed restriction and a main control valve located in series in the main flow line, a subsidiary flow line extending between a first location in the main flow line upstream of the main fixed restriction and a low-pressure region, e.g. the atmosphere, the subsidiary flow line being arranged to generate a reference fluid pressure, and control means responsive to the difference between the reference fluid pressure and a first fluid pressure at or downstream of the main fixed restriction and arranged to control the main control valve in response to such difference in the sense to tend to maintain constant the mass flow of the fluid through the main flow line.

Preferably, the subsidiary flow line includes a plurality of subsidiary restrictions at least one of which is variable, the reference fluid pressure being the pressure at the junction of two of the subsidiary restrictions. Conveniently, the subsidiary flow line includes a first subsidiary fixed restriction and a subsidiary variable restriction and a second subsidiary fixed restriction connected together in series and in that order between the said first location and the said low-pressure region, in which case the reference fluid pressure may be the pressure at the junction of the first subsidiary fixed restriction and the subsidiary variable restriction. Preferably, the second subsidiary fixed restriction is a choking restriction, that is to say the second subsidiary fixed restriction is so chosen in relation to the fluid pressure at the upstream end thereof, that the fluid flow therethrough is substantially independent of the fluid pressure at the downstream end thereof.

In one arrangement according to the first aspect of the invention, the control means includes first means responsive to the difference between the reference fluid pressure and the first fluid pressure and arranged to vary the magnitude of the subsidiary variable restriction in response to such difference so as to tend to maintain such difference zero, the control means also including second means responsive to a second fluid pressure at the junction of the subsidiary variable restriction and the second subsidiary fixed restriction and arranged to control the main control valve in response to variation of the second fluid pressure in the sense to tend to maintain constant the mass flow of the fluid through the main flow line.

In an alternative arrangement according to the first aspect of the invention, the control means includes fourth means arranged to maintain constant the fluid flow through the subsidiary flow line, and fifth means responsive to the difference between the reference fluid pressure and the first fluid pressure and arranged to directly control the main control valve in response to such difference in the sense to maintain constant the mass flow of the fluid through the main flow line.

According to a second aspect of the invention, there is provided apparatus for measuring the mass flow of a fluid through a main flow line, the apparatus including a main fixed restriction located in the main flow line, a subsidiary flow line extending between a first location in the main flow line upstream of the main fixed restriction and a low-pressure region, e.g. the atmosphere, and control means for maintaining the mass flow of the fluid through the subsidiary flow line in predetermined relationship with the mass flow of the fluid through the main flow line, whereby there is generated at a location within the subsidiary flow line a reference fluid pressure which is a function of the mass flow of the fluid through the main flow line.

Preferably, the subsidiary flow line includes a plurality of subsidiary restrictions at least one of which is variable, the reference fluid pressure being the pressure at the junction of two of the subsidiary restrictions.

A number of embodiments of the present invention will now be described by way of example, reference being made to the accompanying drawings, in which:

FIGURE 3 is a view, similar to FIGURE 1, of another form of mass flow control apparatus according to the invention;

Figure 1:
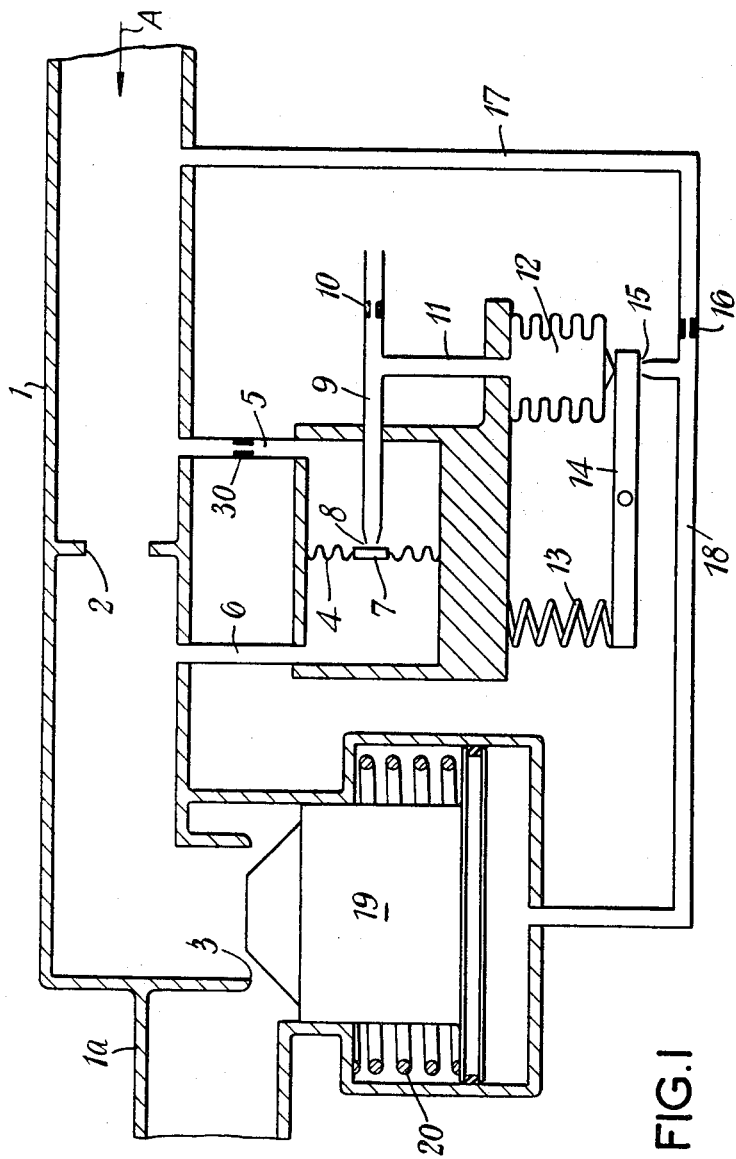
FIGURE 1 is a somewhat diagrammatic view of one form of mass flow control apparatus according to the invention, the flow control apparatus including a mass flow measuring apparatus according to the invention.

The embodiment illustrated in FIGURE 1 comprises apparatus which will respond to the mass flow of a fluid which is either substantially incompressible (so that its density is substantially independent of temperature), or which is maintained at a substantially constant temperature, or which is maintained within a predetermined range of temperatures (within which range its density is substantially independent of temperature). Referring to FIGURE 1, the fluid concerned flows through a main flow line 1 (in the direction of the arrow A), the main flow line 1 having a main fixed restriction 2 and communicating, downstream of the restriction 2, and by way of the orifice 3 of a main control valve, with an extension 1a of the main flow line. A diaphragm 4 is provided in a chamber such that one side of the diaphragm communicates, via a first subsidiary fixed restriction 30 in a passage 5, with the main flow line 1 at a position upstream of the restriction 2, and the other side of the diaphragm 4 communicates, via a passage 6, with the flow line 1 at a position downstream of the restriction 2.

The restriction 2 may be an orifice plate as shown in FIGURE 1, or may be the throat of a venturi tube in which case the passage 6 may open into the throat of the venturi tube.

The diaphragm 4 carries a nozzle-cooperating member 7 which is intended to control the effective opening of a nozzle 8 disposed in proximity thereto on the one side of the diaphragm 4, the nozzle 8 being disposed at one end of a passage 9 communicating through a second subsidiary fixed restriction 10 with the atmosphere. The nozzle 8 and the member 7 afford a subsidiary variable restriction which is connected in series between the fixed restrictions 30 and 10. The apparatus so far described, constitutes a mass flow measuring apparatus.

The passage 9 communicates through a passage 11 with the interior of a flexible bellows 12 which acts, in opposition to a spring 13, upon a pivotally mounted beam 14. The beam 14, by its angular position, controls the effective opening of a further nozzle 15 which opens to the atmosphere and which communicates, on the one hand, through a fixed restriction 16 and a passage 17 with the flow line 1 upstream of the restriction 2 and, on the other hand, through a passage 18, with one side of a valve member 19 of the main control valve, the member 19 being operable to control the effective opening of the orifice 3 and thereby control the mass flow of the fluid along the flow line 1. The valve member 19 is urged towards its open position by a spring 20, in opposition to the pressure prevailing in the pressure chamber communicating with the passage 18.

The operation of the apparatus of FIGURE 1 is as follows. When fluid is flowing, in the direction of the arrow A, along the main flow line 1, a pressure drop occurs across the restriction 2. In addition, some of the fluid flows from the line 1, through the subsidiary flow line constituted by the fixed restriction 30, the variable restriction afforded by the nozzle 8 and member 7, and the fixed restriction 10, to the atmosphere. The pressure at the right-hand side (in FIGURE 1) of the diaphragm 4 will be less than the pressure in the flow line 1 upstream of the restriction 2, and the diaphragm 4 will automatically move, in response to any differential pressure existing across it, until the pressure at the right-hand side (in FIGURE 1) of the diaphragm 4 equals the pressure at the left-hand side (in FIGURE 1) of the diaphragm 4. In other words, the diaphragm 4 will move, relatively to the nozzle 8, thereby varying the effective opening of the variable restriction afforded by the nozzle 8 and the member 7, until the fluid pressures existing at opposite ends of the fixed restriction 30 are identical with the corresponding fluid pressures existing at opposite ends of the fixed restriction 2.

Now, for the majority of the possible different types of restrictions (and, in particular, for restrictions of the form that the restrictions 2 and 5 are shown to have in FIGURE 1, and also for restrictions in the form of venturi tubes), the pressure drop ($\Delta p$) which occurs across the restriction when a fluid of density ($d$) flows through the restriction is given by:

$$\Delta p = cW^2/d \qquad (1)$$

where $c$ is a constant and where $W$ is the mass flow of the fluid through the restriction concerned, the density $d$ of the fluid being measured at the pressure existing at the downstream end of the restriction.

If the Equation 1 is applied to each of the fixed restrictions 2 and 30 in turn, it will be clear that the mass flow $W_{30}$ through the restriction 30 will be proportional to the mass flow $W_2$ through the fixed restriction 2, if the pressure drop $(\Delta)_{30}$ developed across the restriction 30 is equal to the pressure drop $(\Delta p)_2$ developed across the restriction 2 and if, further, the density $d_{30}$ of the fluid downstream of the restriction 30 is equal to the density $d_2$ of the fluid downstream of the restriction 2. These conditions are both met in the apparatus of FIGURE 1, for firstly the pressure drops $(\Delta p)_{30}$ and $(\Delta p)_2$ are maintained equal by the automatic action of the member 7 and the nozzle 8, while, secondly, the densities $d_{30}$ and $d_2$ will be equal provided that the pressures of the fluid downstream of both restrictions are equal (this being automatically ensured by the automatic action of the member 7 and the nozzle 8) and provided that any heat losses at the restrictions 2 and 30, from the fluid to the atmosphere and via the bodies of those restrictions, are substantially negligible and/or are substantially equal (which will normally be the case).

It therefore follows that, in the apparatus of FIGURE 1, the mass flow of the fluid through the fixed restriction 30 (and, therefore, the mass flow of the fluid through the remainder of the subsidiary flow line) will be a fixed proportion of the mass flow through the fixed restriction 2 (and, therefore, of the mass flow of the fluid through the main flow line).

Thus, in particular, the mass flow of the fluid through the fixed restriction 10 will be a fixed proportion of the mass flow of the fluid through the main flow line.

Now the pressure existing upstream of the fixed restriction 10 is a function of the mass flow of the fluid through the restriction 10 (and thus, by the preceding sentence, of the mass flow of the fluid through the main flow line), and is also a function of the pressure at the downstream end of the restriction 10 (i.e., with the arrangement of FIGURE 1, of atmospheric pressure), and is, further, a function of the temperature of the fluid upstream of the restriction 10 (which temperature is assumed, for the case of the apparatus of FIGURE 1, to be constant or substantially constant).

It therefore follows that the pressure upstream of the fixed restriction 10 (i.e., within the passage 9) will be a function only of the mass flow of the fluid through the main flow line, provided that the temperature of the fluid upstream of the restriction 10 remains constant or substantially constant, and provided that the pressure at the downstream end of the restriction 10 is constant or effectively constant. The latter requirement will obviously be met where the atmospheric pressure remains constant but, if this is not so, then the requirement may be met by so choosing the dimensions of the restriction 10 (by reference to the intended range of fluid pressures upstream of the restriction 10) that the restriction 10 is a choking restriction (the fluid flow through which is sonic and therefore substantially independent of the pressure downstream of the restriction 10).

It is thus found that, with the limitations mentioned above, the absolute value of the fluid pressure within the passage 9 will be proportional to the mass flow of the fluid through the main flow line, and this is the basis of mass-flow measuring apparatus according to the invention.

The pressure prevailing in the passage 9 is used to control the effective opening of the nozzle 15, and hence the pressure tending to urge the valve member 19 to the closed position thus any increase in mass flow along the line 1 tends to urge the valve member 19 to the closed position and hence reduce the mass flow along the line. By suitable adjustment of the system parameters (e.g. the spring 13, the spring 20, and the fulcrum of the beam 14) it will be seen that the apparatus may be arranged to operate to maintain the mass flow along the flow lines 1 and 1a substantially constant regardless of the pressure prevailing upstream of the valve-controlled orifice 3.

In the apparatus described, the diaphragm 4 generally has a very low spring-rate and is arranged normally to close the nozzle 8 when there is no flow along the line 1. As soon as any appreciable flow occurs, the diaphragm will move to take up a position equalising the pressures on both faces thereof.

Figure 2:
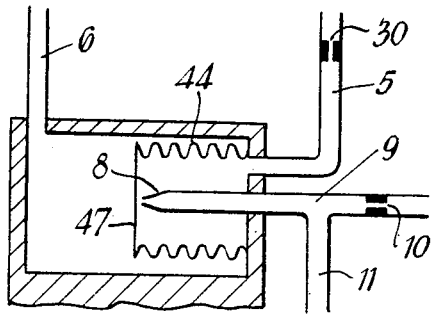
FIGURE 2 shows a modification of the apparatus of FIGURE 1.

FIGURE 2 shows a modification of the arrangement of FIGURE 1, which modification differs from that of FIGURE 1 only in that the diaphragm 4 of FIGURE 1 is replaced by a bellows 44, and in that the nozzle-cooperating member 7 of FIGURE 1 is replaced by the flat end 47 of the bellows 44. The bellows 44 preferably has the same properties as mentioned in the preceding paragraph for the diaphragm 4. The arrangement of FIGURE 2 thus operates identically with the arrangement of FIGURE 1.

The arrangement illustrated in FIGURE 3 is similar in many respects to that illustrated in FIGURE 1, and like reference numerals are used to denote like parts. In this case, the diaphragm 4 and nozzle are omitted. The beam 14 acts somewhat similarly to the diaphragm 4 under the influence of the oppositely acting bellows 12 and 21. The bellows 12 communicates directly with the restricted passage 5 and, through a pressure-reducing valve 22 and the restriction 10, with atmosphere. The bellows 21 communicates directly with the flow line 1 through the passage 6.

The operation of the arrangement of FIGURE 3 is as follows. The pressure-reducing valve 22 is arranged to maintain constant the pressure in the passage 9, upstream of the fixed restriction 10, the valve 22 acting as a subsidiary variable restriction.

It will thus be clear (from the discussion with reference to FIGURE 1) that the valve 22 acts to maintain a constant mass flow of the fluid through the fixed restriction 10 (and, thus, throughout the subsidiary flow line), provided that, firstly, either the atmospheric pressure is maintained constant or the restriction 10 is arranged to be a choking restriction, and provided that, secondly, the temperature of the fluid upstream of the restriction 10 is constant or substantially constant (which is assumed, for the apparatus of FIGURE 3, to be the case). The valve 22 is so set that the constant value of the mass flow of the fluid through the subsidiary flow line is a predetermined fraction of the desired value of the mass flow of the fluid through the main flow line 1.

Since there is thus a constant mass flow of the fluid through the fixed restriction 30, the pressure downstream of the restriction 30 (i.e., the pressure within the bellows 12) will take up a value which will be determined, firstly, by the magnitude of that constant mass flow and, secondly, by the pressure within the main flow line and upstream of the restriction 2. This pressure within the bellows 12 acts as a reference pressure for the pressure within the bellows 21; if the pressure within the bellows 21 is different from that reference pressure, then the beam 14 will tilt and, as described above, will cause the main control valve to open or close as required, thus varying the pressure downstream of the restriction 2 until it becomes equal to the pressure within the bellows 12. The arrangement thus acts to maintain a pressure drop across the restriction 2 equal to that across the restriction 30, and thereby to maintain constant the mass flow of the fluid in the main flow line 1.

Figure 4:
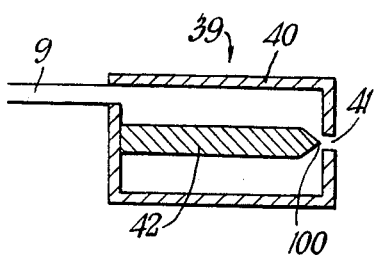
FIGURE 4 shows, somewhat schematically, one possible modification of the apparatus of FIGURES 1-3, which modification permits that apparatus to respond to the mass flow of a fluid of which the temperature is not constant and of which the density varies appreciably with temperature.
Figure 5:
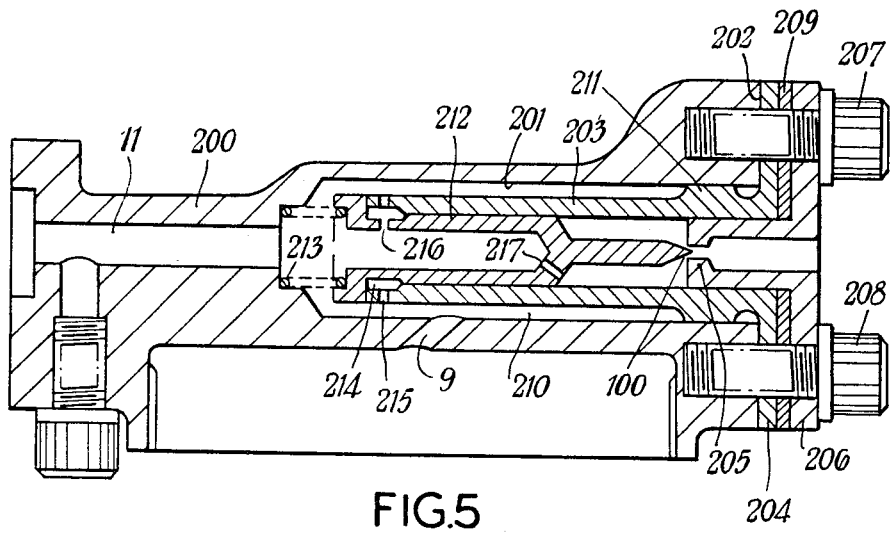
FIGURE 5 shows one practical form of the modified apparatus of FIGURE 4.
Figure 6:
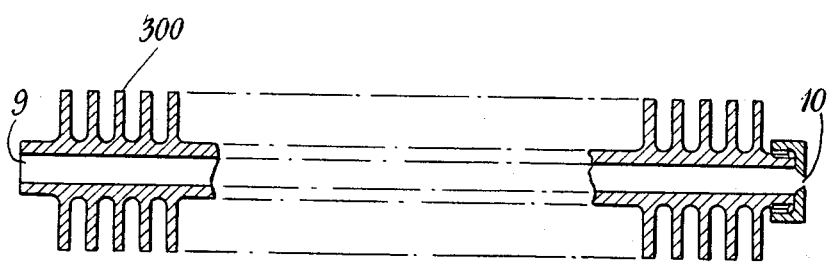
FIGURE 6 shows another possible modification of the apparatus of FIGURES 1-3, which modification permits that apparatus to respond to the mass flow of a fluid of which the temperature is not constant and of which the density varies appreciably with temperature.

FIGURES 4–6 illustrate modifications which may be made to the apparatus of FIGURES 1–3, to cause the apparatus of FIGURES 1–3 to continue to respond to the mass flow of the fluid within the main flow line 1 in cases where the temperature of the fluid within the main flow line is not constant or substantially constant and where the density of that fluid varies appreciably with temperature. In order to permit this requirement to be met, it is necessary, firstly, to ensure that the temperature of the fluid immediately downstream of the fixed restriction 30 is equal or substantially equal to the temperature of the fluid immediately downstream of the fixed restriction 2 (and it will be clear from the preceding discussion that, with the arrangements of FIGURES 1–3, this will be true or approximately true, provided that the heat losses from the fluid to the atmosphere, through the bodies of the restrictions 2 and 30, are substantially negligible and/or substantially equal); it is further necessary to ensure that the fluid pressure immediately upstream of the restriction 10 shall not be a function of the varying temperature of the fluid within the main flow line, and FIGURES 4–6 show apparatus which will effect this desired result.

FIGURE 4 illustrates one form of modification which may be made to the apparatus of FIGURES 1–3, for the purposes described in the preceding paragraph. FIGURE 4 shows a structure 39 which includes a closed cylindrical casing 40 made of one material, the casing 40 having a cylindrical needle-like member 42 (made of a different material) mounted within it. The member 42 is mounted upon one end of the casing 40 and extends, axially of the casing 40, towards the other end of the casing 40; the pointed end of the member 42 projects towards and/or into a circular-section aperture 41 formed in the said other end of the casing 42. The structure 39 of FIGURE 4 thus affords a restriction 100, and the structure 39 is intended to replace the fixed restriction 10 of FIGURES 1–3, the passage 9 of FIGURES 1–3 being connected to the interior of the casing 40 as shown in FIGURE 4.

Suppose the apparatus of FIGURE 1 is modified by the substitution, for the fixed restriction 10, of the structure 39 of FIGURE 4. The modified apparatus operates exactly as described by reference to FIGURE 1, up to the point where it is established that the mass flow of the fluid through the subsidiary flow line (and therefore, in the case of the modified apparatus, the mass flow of the fluid through the restriction 100 within the casing 39) is a fixed proportion of the mass flow of the fluid through the main flow line.

Now, in the case of the modified apparatus, the pressure existing upstream of the restriction 100 is a function of the mass flow of the fluid through the restriction 100 (and thus, by the preceding sentence, of the mass flow of the fluid through the main flow line), and is also a function of the pressure at the downstream end of the restriction 100 (i.e., with the arrangement of FIGURE 4, of atmospheric pressure), and is, further, a function of the temperature of the fluid upstream of the restriction 100.

As discussed with reference to FIGURE 1, the pressure upstream of the restriction 100 is required to be independent of the pressure downstream of the restriction 100: this will be true if the atmospheric pressure remains constant but, if the atmospheric pressure is not constant, then the requirement may be met by so designing the restriction 100 that it becomes a choking restriction (as described with reference to FIGURE 1).

Further, the pressure upstream of the restriction 100 is required to be independent of the temperature of the fluid upstream of the restriction 100. The structure 39 is intended to produce this result, and the result is obtained by allowing the casing 40 and the needle-like member 42 to expand and contract relatively to each other, so varying the effective aperture (i.e., the resistance) of the restriction 100. Thus, the casing 40 and the member 42 are made of different materials (for example, different metals) which have different coefficients of linear expansion, both the casing 40 and the member 42 being intended to respond to the temperature of the fluid upstream of the restriction 100; the arrangement is such (and, in particular, the two different materials are so selected) that the effective aperture (i.e. the resistance) of the restriction 100 so varies with the temperature of the fluid upstream of the restriction 100, that the pressure of the fluid upstream of the restriction 100 becomes substantially independent of the temperature of the fluid upstream of the restriction 100. The exact form of this compensation will be dictated by the manner in which the fluid concerned responds to temperature changes: thus, if the fluid concerned may be considered to behave as a "perfect gas," then the compensation arrangement should be such that the magnitude of the effective cross-sectional area of the restriction 100 is proportional to $\sqrt{T}$, i.e. is proportional to the square root of the absolute temperature T (° K.) of the fluid. For some fluids, the necessary compensation may be obtained, with sufficient accuracy, if the magnitude of the effective cross-sectional area of the restriction 100 is a linear function of the absolute temperature T, i.e., varies as $(a+bT)$, where $a$ and $b$ are constants. More generally, in order to obtain the necessary compensation for a given fluid, simple experiments may be carried out, or available tables may be consulted, to determine how the magnitude of the effective cross-sectional area of the restriction 100 must vary, with the temperature of the fluid upstream of the restriction 100, in order that the pressure of the fluid upstream of the restriction 100 may become substantially independent of that temperature: from the results of such simple experiments, or from the consultation of such tables, the structure 39 is so designed that it produces the required result.

It will thus be clear that the apparatus of FIGURE 1 (or the apparatus of FIGURE 1 when modified according to FIGURE 2), when modified according to FIGURE 4, continues to operate substantially as described above, but responds also in cases where the temperature of the fluid within the main flow line is not constant or substantially constant and where the density of that fluid varies appreciably with temperature.

Suppose the apparatus of FIGURE 3 is modified by the substitution, for the fixed restriction 10, of the structure 39 of FIGURE 4. The modified apparatus operates exactly as described above by reference to FIGURE 3, up to the point where it was established that the valve 22 acts to maintain constant the pressure in the passage 9, upstream of the restriction 100 of the structure 39.

Now, where, as in this case, the temperature of the fluid concerned is not constant and where the density of that fluid varies appreciably with temperature, it will be clear that the valve 22 does not, by itself, maintain a constant mass flow of the fluid through the restriction 100. In order to permit the valve 22 to maintain such a constant mass flow through the restriction 100, not only must the fluid pressure downstream of the restriction 100 be maintained constant or effectively constant (which will be the case if the atmospheric pressure is constant or if the restriction 100 is made a choking restriction as defined above), but also the magnitude of the effective cross-sectional area of the restriction 100 must so vary with the temperature of the fluid upstream of the restriction 100 that, when the pressure upstream of the restriction 100 is maintained constant by the valve 22, the mass flow of the fluid through the restriction 100 is substantially independent of changes of temperature of that fluid upstream of the restriction 100. The latter requirement can be fulfilled by selecting the structure 39 (and, in particular, the different materials) in the same manner as described above by reference to the modified form of FIGURE 1.

It will thus be clear that the apparatus of FIGURE 3 (or the apparatus of FIGURE 3 when modified according to FIGURE 2), when modified according to FIGURE 4, continues to operate substantially as described above by reference to the unmodified FIGURE 3, but responds also in cases where the temperature of the fluid within the main flow line is not constant or substantially constant and where the density of that fluid varies appreciably with temperature.

FIGURE 5 shows one practical form of the structure 39 of FIGURE 4, suitable for use where the fluid concerned is air.

Referring to FIGURE 5, an elongated metal member 200 is provided with a generally cylindrical cavity 201 which extends inwards from the right-hand end 202 of the member 200. An orifice-support member 203 in the form of a cylindrical annulus is mounted within the cavity 201 and has a flanged outer end 204. An orifice member 205, also in the form of a cylindrical annulus, is mounted within the member 203 and has a similar flanged end 206. The members 203 and 205 are bolted into position, upon the member 200, by way of bolts 207 and 208 which extend through the flanges 204 and 206, a sealing washer 209 being interposed between the flanges.

The orifice-support member 203 is generally of smaller diameter than the member 200, so as to provide an annular chamber 210 between those members, but the member 203 has enlarged-diameter portions 211 which locate that member centrally within the cavity 201.

The orifice member 205 is formed at its left-hand end with an orifice in the form of a circular-section passage of suitably small diameter, that orifice providing communication between the interior of the orifice-support member 203 and the atmosphere.

A needle member 212 is mounted within the orifice-support member 203. The member 212 has a central portion in the form of a cylindrical annulus, which central portion is closed at its right-hand end where the central portion merges into a needle of which the point projects into the orifice of the orifice member 205. The central portion of the needle member 212 is flanged at its left-hand end: that flanged end is located upon the left-hand end of the orifice-support member 203 and is pressed thereagainst by a spring 213.

The left-hand end of the orifice-support member 203 is of reduced thickness so as to define an annular chamber 214 between the members 203 and 212. The member 203 is provided with passages 215 which provide communication between the chamber 214 and the annular chamber 210, and the needle member 212 is provided with passages 216 which provide communication between the chamber 214 and the interior of the needle member 212.

The right-hand end of the central portion of the needle member 212 is provided with passages 217 which provide communication between the interior of the needle member 212 and the orifice of the orifice member 205.

In use, the apparatus of FIGURE 5 replaces the fixed restriction 10 of the apparatus of FIGURES 1, 2 or 3. Thus, the passage 9 of those figures communicates (as indicated in FIGURE 5) with the annular chamber 210 of the appartus of FIGURE 5.

The operation of the apparatus of FIGURE 5 is as follows. Fluid (air) from the passage 9 flows into the annular chamber 210, past the spring 213, into the interior of the needle member 212, through the passages 217 and thence, via the orifice (partially restricted by the needle to form an effective restriction at 100), to the atmosphere. (If the spring 213 happens to be compressed, so as to tend to restrict the fluid flow just discussed, then the fluid can flow, alternatively, from the chamber 210 to the chamber 214 via the passages 215 and thence, via the passages 216, to the interior of the needle member 212).

The effective restriction 100 acts (as described by reference to FIGURE 4) similarly to the restriction 10 of FIGURES 1, 2 and 3, but the magnitude of the restriction 100, i.e., the magnitude of the effective cross-sectional area of the restriction 100 is a predetermined suitable function of the temperature of the fluid upstream of the restriction 100, that function being selected as described above by reference to FIGURE 4.

Thus, the orifice support member 203 and the needle member 212 are made of different metals with different temperature coefficients of linear expansion. Since both of the members 203 and 212 are subjected to the temperature of the fluid upstream of the restriction 100, it will be clear that the members 203 and 212 expand or contract differentially, so that the point of the needle of the needle member 212 moves towards or away from the orifice of the orifice member 205 when that temperature changes, so varying the effective resistance of the restriction 100 as a function of that temperature.

Where the apparatus of FIGURE 5 is used with air as the fluid concerned, the orifice support member 203 may be made of DTD 247 steel having a high temperature coefficient of linear expansion of, say, $22 \times 10^{-6}$ per degree C., and the needle member 212 may be made of a nickel alloy such as, for example, Ni-Span C 902, which has a temperature coefficient of linear expansion of about $6 \times 10^{-6}$ per degree C.

Where the apparatus of FIGURE 5 is used to modify the apparatus of FIGURES 1 or 2, the passage 11 of FIGURES 1 and 2 is connected to the cavity 201 (FIGURE 5) as indicated in FIGURE 5. Where the apparatus of FIGURE 5 is used to modify the apparatus of FIGURE 3, the passage 11 of FIGURE 5 is omitted.

According to another aspect of the invention, a different form of modification is made to the apparatus of FIGURES 1, 2 or 3, in order to permit that apparatus to continue to respond to the mass flow of the fluid within the main flow line 1 in cases where the temperature of the fluid within the main flow line is not constant or substantially constant and where the density of that fluid varies appreciably with temperature.

This different form of modification takes the form of providing means for ensuring that the temperature of the fluid upstream of the fixed restriction 10 remains substantially constant. If this is so, it will be clear from the discussion above by reference to FIGURES 1 and 3, that the apparatus of FIGURES 1 and 3 will continue to operate as required, despite changes of temperature of the fluid within the main flow line.

Thus, the apparatus of FIGURE 1 may be modified to this end by providing, immediately upstream of the fixed restriction 10 (or within the passage 5) a heat exchanger arranged to tend to change the temperature of the fluid within the passage 9 to a predetermined constant or substantially constant value. A simple form of such a heat exchanger is shown in FIGURE 6, where the passage 9 is surrounded, immediately upstream of the fixed restriction 10, by an arrangement of fins 300 which permit heat-exchange between the fluid within the passage 9, and the atmosphere. The apparatus of FIGURE 2 may be similarly modified.

The apparatus of FIGURE 3 may be modified in a generally similar manner but, in this case, the heat exchanger must be located upstream of the valve 22.

In the arrangement so far described in this specification, the fluid concerned is air which escapes to the atmosphere through the restriction 10 or 100 and at the nozzle 15. It is to be understood that, in cases where the fluid concerned is not air (and even in the case of air), the fluid escaping through the restriction 10 or 100 and the nozzle 15 may instead be returned, in generally known manner, to a return line for the fluid concerned (within which return line the fluid pressure should preferably be substantially constant).

We claim:

1. Apparatus for controlling the flow of a fluid through a main flow line, the apparatus including a main restriction and a main control valve located in series in said main flow line, a normally open subsidiary flow line extending between a first location in said main flow line upstream of said main restriction and a low-pressure region, a first subsidiary restriction and a subsidiary variable restriction and a second subsidiary restriction connected together in series within said subsidiary flow line and in that order between said first location and said low-pressure region so as to carry a flow of fluid proportional to the desired flow of fluid in the main flow line and generate a reference fluid pressure between said first subsidiary restriction and said subsidiary variable restriction, flow-responsive means located within said subsidiary flow line and arranged to tend to maintain constant the flow of said fluid through said subsidiary flow line, and control means responsive to the difference between said reference fluid pressure and a second fluid pressure at a selected one of positions between said main restriction and said main control valve and arranged to control said main control valve in response to said pressure difference to tend to maintain constant said flow of said fluid through said main flow line.

2. Apparatus according to claim 1, wherein said flow-responsive means comprises a pressure-reducing valve constituting said subsidiary variable restriction and arranged to tend to maintain constant the fluid pressure at the junction of said pressure-reducing valve and said second subsidiary restriction.

3. Apparatus according to claim 2, wherein said second subsidiary restriction is a choking restriction, that is to say said second subsidiary restriction is so chosen in relation to the fluid pressure at the upstream end thereof, that the fluid flow therethrough is substantially independent of the fluid pressure at the downstream end thereof.

4. Apparatus for controlling the flow of a fluid through a main flow line, the apparatus including a main restriction and a main control valve located in series in said main flow line, a normally open subsidiary flow line extending between a first location in said main flow line upstream of said main restriction and a low-pressure region, a first subsidiary restriction and a subsidiary variable restriction and a second subsidiary restriction connected together in series within said subsidiary flow line and in that order between said first location and said low-pressure region so as to carry a flow of fluid proportional to the desired flow of fluid in the main line and generate a reference fluid pressure between said first subsidiary restriction and said subsidiary variable restriction, flow-responsive means located within said subsidiary flow line and arranged to tend to maintain constant the flow of said fluid through said subsidiary flow line, and control means responsive to the difference between said reference fluid pressure and a second fluid pressure at a selected one of positions between said main restriction said main control valve and arranged to control said main control valve in response to said pressure difference to tend to maintain constant said mass flow of said fluid through said main flow line, and wherein said second subsidiary restriction is a choking restriction, that is to say said second subsidiary restriction is so chosen in relation to the fluid pressure at the upstream end thereof, that the fluid flow therethrough is substantially independent of the fluid pressure at the downstream end thereof.

5. Apparatus according to claim 1, wherein said control means includes a pair of flexible bellows operably arranged to expand and contract in mutual opposition and respectively in accordance with said reference fluid pressure and said second fluid pressure, and includes means responsive to the differential movement of said control pair of bellows and arranged to control said main control valve in response to said differential movement in the sense to tend to maintain constant said mass flow of said fluid through said main flow line.

6. Apparatus according to claim 5, which includes a beam, a nozzle, a further subsidiary restriction and a pressure fluid supply, and wherein said main control valve has a pressure chamber, said control means including said beam movable in relation to said nozzle to vary the effective opening of said nozzle, said nozzle being connected, on the one hand, through said further subsidiary restriction to said pressure fluid supply and, on the other hand, to said pressure chamber.

7. Apparatus according to claim 6, wherein said nozzle is connected, through said further subsidiary restriction, to a second location in said main flow line upstream of said main restriction.

8. Apparatus according to claim 1, wherein said main control valve includes spring means, a pressure chamber, and a movable valve member movable in response to the valve pressure within said pressure chamber, and against the action of said spring means to control said mass flow of said fluid through said main flow line in response to said valve pressure, said apparatus including means for controlling said valve pressure in response to said difference between said reference fluid pressure and said first fluid pressure.

9. Apparatus for controlling the mass flow of a fluid through a main flow line, the apparatus including a main restriction and a main control valve located in series in said main flow line, a normally open subsidiary flow line extending between a first location in said main flow line upstream of said main restriction and a low-pressure region, a first subsidiary restriction and a subsidiary variable restriction and a second subsidiary restriction connected together in series within said subsidiary flow line and in that order between said first location and said low-pressure region so as to carry a flow of fluid proportional to the desired mass flow of fluid in the main flow line and generate a reference fluid pressure between said subsidiary variable restriction and one of said first and second subsidiary restrictions, temperature-responsive means located within said subsidiary flow line and responsive to the temperature of said fluid within that line to tend to maintain a selected one of the fluid pressure immediately upstream of said second subsidiary restriction and the mass flow of said fluid through said second subsidiary restriction substantially independent of said temperature, and control means responsive to the difference between said reference fluid pressure and a second fluid pressure at a selected one of positions between said main restriction and said main control valve and arranged to control said main control valve in response to said pressure difference to tend to maintain constant said mass flow of said fluid through said main flow line.

10. Apparatus according to claim 9, wherein said temperature-responsive means comprises said second subsidiary restriction which is arranged to be responsive to said temperature of said fluid upstream of said second subsidiary restriction to thereby vary the magnitude of the resistance of said second subsidiary restriction with said temperature in the sense to tend to cause said mass flow of said fluid through said second subsidiary restriction to be substantially independent of said temperature.

11. Apparatus according to claim 9, wherein said temperature-responsive means comprises said second subsidiary restriction which is arranged to be responsive to said temperature of said fluid upstream of said second subsidiary restriction to thereby vary the magnitude of the resistance of said second subsidiary restriction with said temperature in the sense to tend to cause the fluid pressure of said fluid immediately upstream of said second subsidiary restriction to be substantially independent of said temperature.

12. Apparatus for controlling the mass flow of a fluid through a main flow line, the apparatus including a main restriction and a main control valve located in series in said main flow line, a normally open subsidiary flow line extending between a first location in said main flow line upstream of said main restriction and a low-pressure region, a subsidiary fixed restriction and a subsidiary variable restriction and a subsidiary temperature-responsive restriction connected together in series within said subsidiary flow line and in that order between said first location and said low-pressure region so as to carry a flow of fluid proportional to the desired mass flow of fluid in the main flow line and generate a reference fluid pressure between said subsidiary fixed restriction and said subsidiary variable restriction and one of said fixed and temperature-responsive subsidiary restriction, said subsidiary temperature-responsive restriction being responsive to the temperature-responsive restriction to thereby vary the magnitude of the resistance of said subsidiary temperature-responsive restriction with said temperature in the sense to tend to cause a selected one of the fluid pressure immediately upstream of said subsidiary temperature-responsive restriction and the mass flow of said fluid through said subsidiary temperature-responsive restriction to be substantially independent of said temperature over a range of said temperatures, and control means responsive to the difference between said reference fluid pressure and a second fluid pressure at a selected one of positions between said main restriction and said main control valve and arranged to control said main control valve in response to said pressure difference to tend to maintain constant said mass flow of said fluid through said main flow line.

13. Apparatus according to claim 12, wherein the effective cross-sectional area of said subsidiary temperature-responsive restriction is arranged to vary as the square root of the absolute temperature $T(°K.)$ of said fluid immediately upstream of said subsidiary temperature-responsive restriction.

14. Apparatus according to claim 12, wherein the effective cross-sectional area of said subsidiary temperature-responsive restriction is arranged to vary as a linear function of the absolute temperature $T(°K.)$ of said fluid immediately upstream of said subsidiary temperature-responsive restriction.

15. Apparatus according to claim 12, which includes two relatively movable members having different temperature coefficients of linear expansion and both subjected to said temperature, said two relatively movable members being arranged, by differential expansion and contraction thereof, to vary the magnitude of the resistance of said subsidiary temperature-responsive restriction with said temperature in said sense.

16. Apparatus according to claim 15, wherein said two relatively movable members respectively comprise a needle-like member and an orifice-carrying member, said needle-like member being arranged to co-operate with said orifice to form said subsidiary temperature-responsive restriction.

17. Apparatus for controlling the mass flow of a fluid through a main flow line, the apparatus including a main fixed restriction and a main control valve located in series in said main flow line, a normally open subsidiary flow line extending between a first location in said main flow line upstream of said main fixed restriction and a low-pressure region, a subsidiary fixed restriction and a subsidiary variable restriction and a subsidiary temperature-responsive restriction connected together in series and in that order between said first location and said low-pressure region and within said subsidiary flow line and arranged to carry a flow of fluid proportional to the desired mass flow in the main flow line and generate a reference fluid pressure between said subsidiary fixed restriction and said subsidiary variable restriction, and control means responsive to the difference between said reference fluid pressure and a second fluid pressure at a selected one of positions between said main fixed restriction and said main control valve and arranged in response to said pressure difference to control said main control valve to tend to maintain constant said mass flow of said fluid through said main flow line, said subsidiary temperature-responsive restriction being a choking restriction and being responsive to the temperature of said fluid upstream of said subsidiary temperature-responsive restriction to thereby vary the magnitude of the resistance of said subsidiary temperature-responsive restriction with said temperature in the sense to tend to cause a selected one of the mass flow of said fluid through said subsidiary temperature-responsive restriction and the fluid pressure immediately upstream of said subsidiary temperature-responsive restriction to be substantially independent of said temperature over a range of said temperatures.

18. Apparatus for controlling the mass flow of a fluid through a main flow line, the apparatus including a main restriction and a main control valve located in series in said main flow line, a normally open subsidiary flow line extending between a first location in said main flow line upstream of said main restriction and a low-pressure region, a first subsidiary restriction and a subsidiary variable restriction and a second subsidiary restriction connected together in series within said subsidiary flow line and in that order between said first location and said low-pressure region so as to carry a flow of fluid proportional to the desired mass flow of fluid in the main flow line and generate a reference fluid pressure between said subsidiary variable restriction and one of the first and second subsidiary restrictions, the apparatus including a region of substantially constant temperature, and including heat-exchange means located upstream of said second subsidiary restriction and arranged to permit the exchange of heat between said fluid upstream of said second subsidiary restriction and said region to thereby tend to maintain constant the temperature of said fluid upstream of said second subsidiary restriction, and including control means responsive to the difference between said reference fluid pressure and a second fluid pressure at a selected one of positions between said main restriction and said main control valve and arranged to control said main control valve in response to said pressure difference to tend to maintain constant said mass flow of said fluid through said main flow line.

19. Apparatus according to claim 18, wherein said region is a portion of the atmosphere adjacent to said heat-exchange means, and wherein said heat-exchange means comprises an arrangement of fins.

References Cited
UNITED STATES PATENTS

| | | | |
|---|---|---|---|
| 2,405,888 | 8/1946 | Holley | 137—486 X |
| 2,451,029 | 11/1948 | Hughes | 137—486 X |
| 2,566,773 | 9/1951 | Otis | 137—486 |

M. CARY NELSON, *Primary Examiner.*

R. J. MILLER, *Assistant Examiner.*